Patented May 20, 1930

1,759,554

UNITED STATES PATENT OFFICE

FRANZ HENLE AND BARTHOLOMÄUS VOSSEN, OF HOCHST-ON-THE-MAIN, GERMANY, ASSIGNORS TO GENERAL ANILINE WORKS, INC., OF NEW YORK, N. Y., A CORPORATION

PROCESS FOR PREPARING 6-CHLORO-2-NITRO-1-METHYLBENZENE-4-SULPHONIC ACID

No Drawing. Application filed August 24, 1925, Serial No. 52,216, and in Germany September 1, 1924.

The present invention relates to a new process for preparing 6-chloro-2-nitro-1-methylbenzene-4-sulphonic acid.

Our new process comprises treating 6-chloro-2-nitro-1-methylbenzene with sulfuric acid containing sulfuric acid anhydride. The reaction product thus obtainable consists almost completely of 6-chloro-2-nitro-1-methylbenzene-4-sulphonic acid and contains only a small quantity of an easily separable by-product.

We have furthermore found that one may use in our process as starting material a mixture of 6-chloro-2-nitro-1-methylbenzene and 4-chloro-2-nitro-1-methylbenzene as it is for instance industrially produced by chlorinating 2-nitro-1-methylbenzene. We have found that the sulfonation of the 6-chloro-2-nitro-1-methylbenzene occurs more easily than that of 4-chloro-2-nitro-1-methylbenzene and that it is possible to carry out the sulfonation process under such conditions that a sulfonation of the 6-chloro-2-nitro-1-methylbenzene is effected whereas the 4-chloro-2-nitro-1-methylbenzene remains unaltered.

The above mentioned fact offers at the same time a new method of separating the 6-chloro-2-nitro-1-methylbenzene from the 4-chloro-2-nitro-1-methylbenzene, which separation could hitherto be effected only by fractional distillation.

It is particularly advantageous to subject to sulfonation the eutectic mixture of 6-chloro-2-nitro-1-methylbenzene and 4-chloro-2-nitro-1-methylbenzene which is produced during the fractional distillation and can not be further separated by fractionation; by this operation the 4-chloro-2-nitro-1-methylbenzene is isolated almost completely in a technically pure state, whereas the 6-chloro-2-nitro-1-methylbenzene is converted into the 6-chloro-2-nitro-1-methylbenzene-4-sulphonic acid.

A further object of our present invention is the particular method of separating the sulfonated portion from the non-sulfonated portion. We have made the observation that it is not at all possible to separate in a satisfactory manner the unaltered 4-chloro-2-nitro-1-methylbenzene from the dissolved 6-chloro-2-nitro-1-methylbenzene-4-sulphonic acid by pouring the sulfonation mixture into water, because the diluted sulfuric acid causes a great part of the non-sulfonated, oily 4-chloro-2-nitro-1-methylbenzene to be suspended and even dissolved. Furthermore, when the sodium 6-chloro-2-nitro-1-methylbenzene-4-sulfonate is directly salted out, the nonsulfonated 4-chloro-2-nitro-1-methylbenzene is enclosed by the formed crystals, which renders a mechanical separation impracticable.

The separation of the two substances in question can however be effected by carrying out the salting-out operation in two stages, namely by first adding only so much common salt that the sodium 6-chloro-2-nitro-1-methylbenzene-4-sulfonate is not yet salted out, whereas the non-sulfonated 4-chloro-2-nitro-1-methylbenzene is thereby practically almost completely removed from its suspension or solution. It is only after the isolation of the non-sulfonated, oily 4-chloro-2-nitro-1-methylbenzene, which can now be easily effected, that the sodium salt of the 6-chloro-2-nitro-1-methylbenzene-4-sulphonic acid is salted out by a further addition of common salt. Also in this case there is still left 2% of 4-chloro-2-nitro-1-methylbenzene in the separated sodium salt of the 6-chloro-2-nitro-1-methylbenzene-4-sulphonic acid; this remainder can, if required, be removed very easily by distillation with steam, if the mass is previously rendered slightly alkaline with sodium carbonate.

The following example illustrates our invention, the parts being by weight:

Into 4287 parts of the technical mixture of about equal parts of 6-chloro-2-nitro-1-methylbenzene and 4-chloro-2-nitro-1-methylbenzene are run at 75–80° C., while stirring well 6000 parts of oleum of 20% strength. The mixture is stirred for another 7—8 hours at the same temperature. The sulfonated mixture is then introduced into a solution of 2500 parts of common salt in 40,000 parts of water, care being taken to maintain a temperature of 80° C. which must however not be exceeded. The resulting mass is stirred for some time and the non-sulfonated, oily 4-chloro-2-nitro-1-methylbenzene is then allowed to separate; it is then separated by draining off whereupon to the acid aqueous solution are further added, while stirring, 9000 parts of common salt. After cooling, the isolated sodium salt of the 6-chloro-2-nitro-1-methylbenzene-4-sulphonic acid is filtered by suction.

The yield of 6-chloro-2-nitro-1-methylbenzene-4-sulfonate of sodium thus separated amount to more than 70% of the theory with regard to the original percentage of 6-chloro-2-nitro-1-methylbenzene. The yield of unaltered 4-chloro-2-nitro-1-methylbenzene is almost quantitative with regard to the original percentage of 4-chloro-2-nitro-1-methylbenzene.

By reducing the 6-chloro-2-nitro-1-methylbenzene-4-sulphonic acid to 6-chloro-2-amino-1-methylbenzene-4-sulphonic acid by the usual methods almost quantitative yields are obtained.

The separating process as above described is independent within wide limits of the quantitative proportion of the two isomerides; except that in case of the proportion of 6-chloro-2-nitro-1-methylbenzene to the 4-chloro-2-nitro-1-methylbenzene in the mixture to be separated being greater than that in the foregoing example, the respective quantities of oleum and common salt must be adequately increased.

We claim:

1. The process which comprises treating a mixture of 6-chloro-2-nitro-1-methylbenzene and 4-chloro-2-nitro-1-methylbenzene with sulfuric acid containing sulfuric anhydride at a temperature not substantially above 80° C., treating the resulting reaction mixture with a quantity of sodium chloride sufficient to precipitate the unsulfonated 4-chloro-2-nitro-1-methylbenzene but insufficient to precipitate the sodium salt of 6-chloro-2-nitro-1-methylbenzene-4-sulphonic acid in the presence of water, separating the precipitated 4-chloro-2-nitro-1-methylbenzene from the solution, and treating the solution with sodium chloride in quantity sufficient to precipitate the sodium salt of 6-chloro-2-nitro-1-methylbenzene-4-sulphonic acid.

2. The process which comprises treating 6-chloro-2-nitro-1-methylbenzene with sulfuric acid containing sulfuric acid anhydride at a temperature not substantially above 80° C. and isolating the resulting 6-chloro-2-nitro-1-methylbenzene-4-sulphonic acid by salting it out in the presence of water.

3. The process which comprises treating a mixture of 6-chloro-2-nitro-1-methylbenzene and 4-chloro-2-nitro-1-methylbenzene with sulfuric acid containing sulfuric acid anhydride at a temperature not substantially above 80° C.

In testimony whereof, we affix our signatures.

Dr. FRANZ HENLE.
BARTHOLOMÄUS VOSSEN.